May 28, 1929.   H. F. SCHMIDT   1,715,010
BEARING
Filed Jan. 24, 1921   2 Sheets-Sheet 1

INVENTOR.
Henry F. Schmidt
BY D. C. Davis
ATTORNEY

May 28, 1929.  H. F. SCHMIDT  1,715,010
BEARING
Filed Jan. 24, 1921  2 Sheets-Sheet 2

Henry F. Schmidt
INVENTOR.

BY D. C. Davis
ATTORNEY

Patented May 28, 1929.

1,715,010

UNITED STATES PATENT OFFICE.

HENRY F. SCHMIDT, OF SWARTHMORE, PENNSYLVANIA, ASSIGNOR TO WESTINGHOUSE ELECTRIC AND MANUFACTURING COMPANY, A CORPORATION OF PENNSYLVANIA.

BEARING.

Application filed January 24, 1921. Serial No. 439,622.

My invention relates to journal bearings and more particularly to a lubricating system for thrust and radial bearings and it has for an object the provision of an external receptacle and band-applying means in apparatus of the character designated, whereby oil may be supplied to a bearing or bearings. A further object of the invention is to provide guard means in conjunction with the band-applying device to recover oil cast off therefrom. Another object is to form the thrust collar and its cooperating bearing structure to act as oil-impelling means to forcibly expel oil from the thrust bearing to any desired part.

These and other objects are attained by means of apparatus embodying the features herein described and illustrated in the drawings accompanying and forming a part of this application in which—

Figure 1:
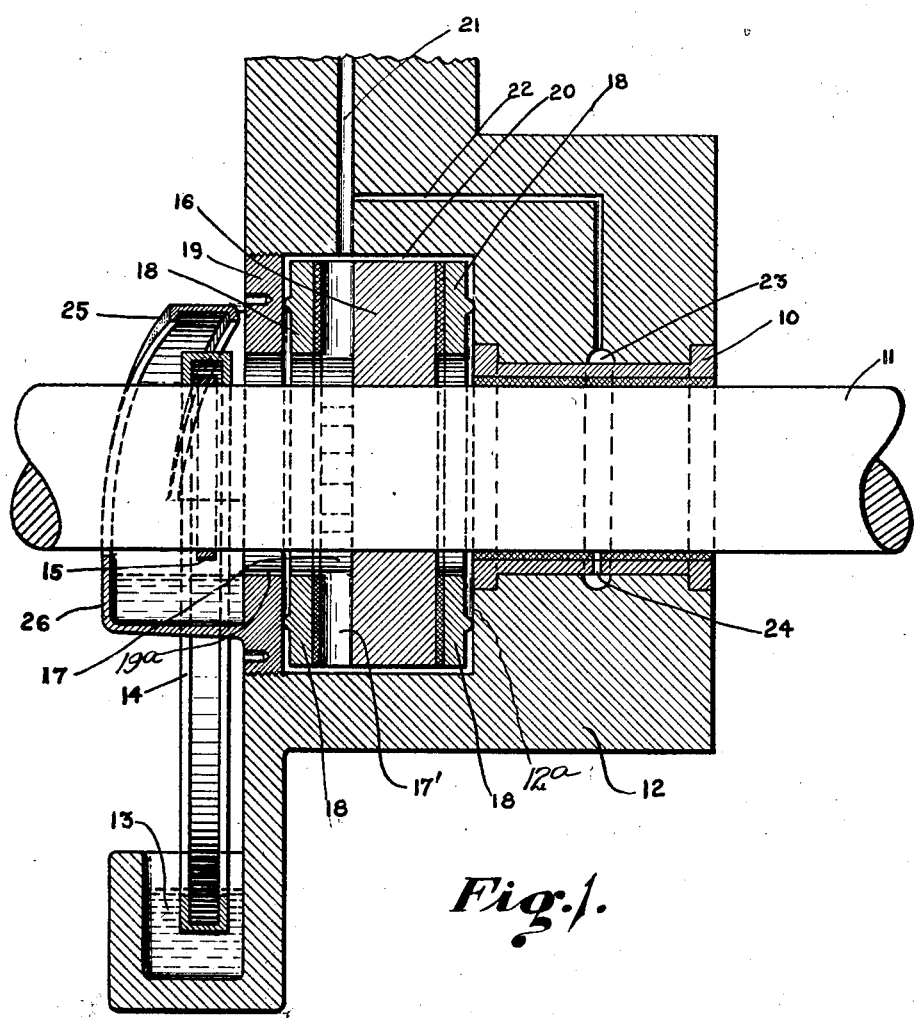
Fig. 1 is a sectional view through a shaft bearing and a thrust bearing illustrating one form of my novel lubricating apparatus.

Referring to the drawings in Fig. 1 I indicate a journal bearing 10 for a shaft 11 which is mounted in a bearing-supporting means 12, which may be a part of the machine to which the shaft 11 belongs. As shown, the member 12 is so formed as to provide a relatively large oil receptacle 13 below the shaft 11.

A ring 14, of channel-shaped cross-section, rides on the shaft 11 and dips into the oil within the receptacle 13 so that as the shaft 11 rotates, the ring 14 is carried around by rolling contact and carries a considerable quantity of oil up to the shaft 11. A collar 15 is provided on the shaft to prevent the oil ring 14 from working along the shaft 11 away from the casing 12.

A centrifugal impeller 16 is mounted on the shaft 11 between the ring 14 and the bearing 10 and is adapted to receive the oil carried up by the ring 14 and to force it into the bearing 10 under pressure. The centrifugal impeller 16 is provided with a cylindrical recess 17 and radial grooves 17' extending from the recess to the periphery thereof. The oil passing along the shaft and entering the recess 17 is discharged outwardly through the grooves to the periphery of the impeller, because of centrifugal force.

The centrifugal impeller 16 serves not only as a means to deliver the oil to the bearings under pressure but also as a collar for a thrust bearing. The thrust bearing comprises the impeller 16 attached to the shaft and a series of radial shoes 18 of the Kingsbury or similar type disposed around the shaft on both sides of the impeller. The inner series of shoes 18 bears directly against the bearing-supporting means 12, while the outer series of shoes bears against an annular member 19 threaded to the casing so that it may be removed to permit the removal of the shaft carrying the impeller.

A collecting chamber 20 formed in the supporting means 12 for the impeller 16 and defined by the lateral walls 19 and 12$^a$ is adapted to receive the oil discharged through the radial slots of the impeller. A conduit or oil passage 21 formed within the bearing support 12 is employed for delivering oil under pressure from the collecting chamber 20 to the bearings, the branch passageway 22 supplying oil to the bearing 10. The oil delivered through the passageway 22 preferably enters an annular chamber 23 surrounding the bearing 10 and is finally delivered to the surfaces of the bearing by means of holes 24. The collecting chamber 20 also serves to deliver oil under pressure to the working surfaces of the thrust bearing.

In order to catch any oil that may tend to fly away from the ring 14 due to the high speed of rotation, a special oil guard or deflecting and directing means 25 is provided. This guard or deflector, channel-shaped in section, is located directly above the ring 14 at the top, and recedes from the ring at the bottom in order to allow rotation of the latter without contacting with the guard or deflector. The guard or deflector 25 is shown as an integral part of the oil collecting reservoir or receptacle 26, which, in turn, is shown as an integral part of the retaining ring 19, although it is obvious that these parts may be made separately and secured together. Oil discharged from the outer surface of the oil ring 14 is collected by the guard or deflector 25 and returned thereby to the reservoir or receptacle 26. When the oil in the reservoir or receptacle 26 reaches a sufficient height, it is discharged through the shaft opening 19a about the shaft 11 to the receiving chamber 17 of the impeller 16; and, upon entering the receiving chamber 17 it is translated and pressure thereof is developed by the radial passages 17'. In this way, pressure of oil is developed in the region of the chamber 20 about the periphery of the collar 16 and oil is supplied therefrom through the passages 21 and 22 for lubrication of a bearing or bearings, for example, the radial bearing 10.

From the structure described, it will be noted that the bearing supporting means or housing structure 12 is provided with a radial bearing 10 having a shaft 11 journaled therein. Such supporting means or structure is provided with a chamber 20 having an inner wall 12a defined in part by the inner end of the bearing 10 and an outer wall 19 having a shaft opening 19a aligned with the journal bearing 10 but of larger diameter, thereby providing for the ready admission of the lubricant from the receptacle 26. Since the thrust collar 16 embodies means for translating and developing pressure of oil, such oil as enters through the opening 19a is translated and has pressure thereof developed due to the special means provided in the impeller.

Figure 2:
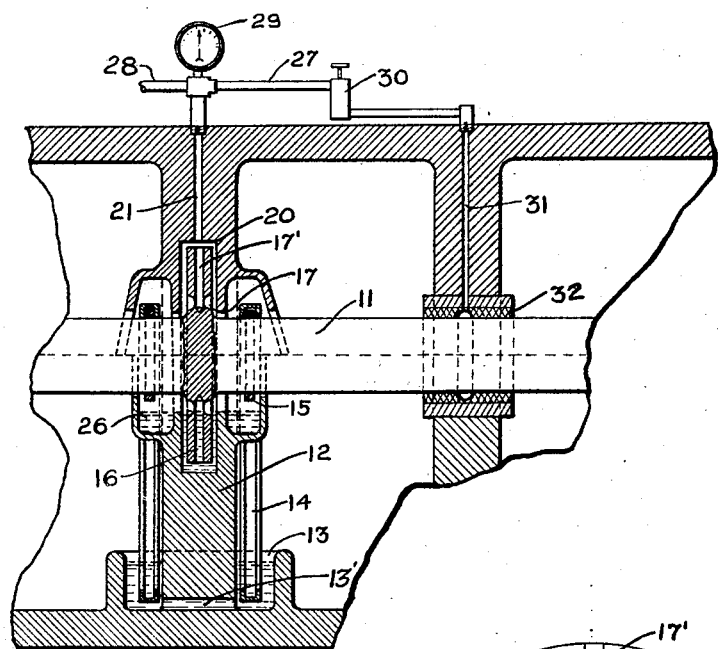
Fig. 2 is a sectional view through a shaft bearing illustrating a modified form of the apparatus shown in Fig. 1.
Figure 3:
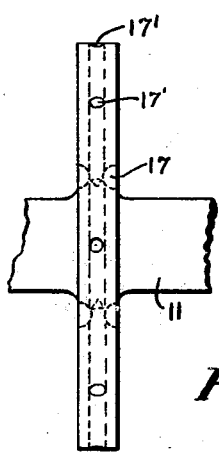
Fig. 3 is a side view in elevation and Fig. 4 is an end view, in elevation, of the impeller illustrated in Fig. 2.
Figure 4:
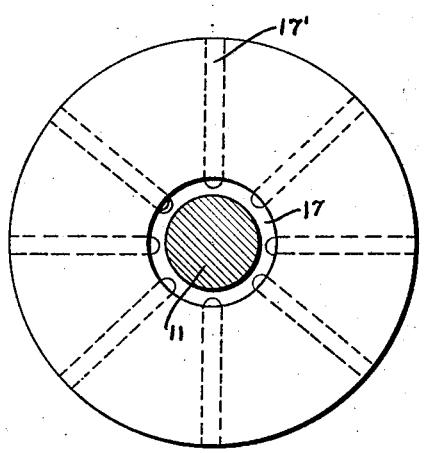

In Fig. 2 I show a modified construction of the impeller 16 indicated in Fig. 1. The impeller 16 is provided with a circumferential groove 17 on each side near its inner periphery and the grooves are of a sufficient depth to communicate with the radial passages 17' located centrally of the impeller. Lubricant is supplied by two reservoirs 13 formed integral with the casing 12. The reservoirs have a communicating passage 13' at their bottoms that serves to maintain an equal level of lubricant in the reservoirs. As heretofore described, the rings 14 guided by collars 15 carry the lubricant from the lower reservoirs 13 to the higher reservoirs 26, which are located on opposite sides of the impeller 16. In the arrangement as shown, lubricant from the two reservoirs 26, flows to the grooves 17 where it is caught by the radial passages 17' and discharged by outwardly centrifugal force to the circumferential collecting chamber 20. The conduit or oil passage 21 delivers lubricant from the chamber 20 to the branch supply conduits 27 and 28 in which is located a pressure gauge 29. As shown, the branch conduit 27 supplies lubricant to the bearing 32 through a valve 30 and conduit 31 and obviously the branch 28 may be employed to conduct lubricant under pressure to any part of the machine.

From the above description of my invention, the operation thereof will be obvious. Oil is placed in the lower receptacle 13 and conducted by the ring 14 to the upper receptacle, the guard or deflector 25 serving to deflect oil cast off from the ring into the receptacle 26. Oil flows into the thrust bearing to lubricate it and the collar of the thrust bearing, in which are radial grooves, acts as an impeller to force oil to any desired part, for example, the bearing 10 which is located adjacent to the thrust bearing. Apparatus constructed in accordance with my invention finds great utility in marine practice where great oil pressures are maintained on bearings where great oil pressures are sustained.

In a like manner, as shown in Fig. 2, the impeller 16, with the collecting rings 14 and reservoirs 26, located on each side, is readily adapted to supply forced lubrication to all parts of the machine at requisite pressures.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination of a lubricating journal-bearing having a bearing portion, cylindrical recess with threaded outer end and a passageway connecting the recess and bearing portion; a shaft journaled in the bearing portion; an impeller for forcing lubricant radially outward fixed to the shaft, rotatable within the recess, and having thrust surfaces; a thrust member seated within the recess and cooperating with one thrust surface of the impeller; a member screw-threaded to the threaded end of said recess cooperative with said thrust member; and a second thrust member seated in the recess and bearing against the other thrust surface of the impeller.

2. The combination with a shaft, of a lubricating journal-bearing therefor having a recess and bearing portion with a passageway affording communication between the recess and bearing portion, an impeller within the recess, a closure member for the recess, a lubricant receptacle secured to the closure member, an oil-catching portion above the receptacle, an oil receptacle secured to the bearing beneath the receptacle of the closure member, and an oiling ring carried by the shaft dipping in the latter receptacle and adapted when in operation to convey oil above the shaft and thence to the closure-member receptacle and at sufficiently high speeds to cast oil into said oil-catching portion.

3. The combination with a shaft, of a lubricated bearing comprising a receptacle carried beneath the bearing, an oiling ring supported on the shaft and dipping into the receptacle, a receptacle directly beneath the shaft adapted to receive oil brought up by the ring and in communication with the bearing to be lubricated, oil catching and directing means supported by the second receptacle at one side of the ring and inclined so as to cover a portion of the ring, and impeller means adapted to receive oil from the second receptacle.

4. The combination of a shaft, a bearing therefor, oil receptacles supported by the bearing, band-applying means supported by the shaft and adapted to conduct oil from one receptacle to the other, guard means carried by the latter receptacle to deflect therein oil cast from the band-applying means, and pressure creating means to distribute oil from the latter receptacle to the bearing.

5. In a thrust-bearing the combination of a thrust supporting element, oil impeller means carried thereby, an oil receptacle connected thereto and communicating with the bearing, a ring for supplying oil to the receptacle, and guard means above said receptacle to deflect thereinto oil cast off by said oil supplying ring.

6. A journal bearing structure including a bearing, lubricant receptacles supported at one side of the structure, means for conveying lubricant from one receptacle to the other, pump means to distribute oil from the last named receptacle to the bearing, and guard means arranged above the latter receptacle to deflect oil thereinto cast off by said conveying means.

7. The combination of a radial bearing, a thrust bearing, supporting means for said bearings having a passageway connecting the bearings, a shaft supported by the bearings, oil receptacles carried by the supporting means one being above the other and the upper receptacle being immediately beneath the shaft and in communication with the thrust bearing, an oil ring supported on the shaft above the upper receptacle and arranged to dip into the lower receptacle, means on the shaft to prevent lateral displacement of the oil ring, an oil guard carried by the upper receptacle and covering a portion of said ring and adapted to deflect oil cast therefrom into the upper receptacle, said thrust bearing acting as oil impelling means to force oil through the passageway to the radial bearing.

8. In a bearing structure, the combination of a housing, a rotatable shaft disposed within the housing, a thrust collar provided on the shaft, a plurality of segmental bearing shoes interposed between the thrust collar and the housing, a lubricant receptacle, band applying means supported by the shaft and adapted to conduct lubricant from the receptacle to the inner-periphery of the thrust collar, pumping means provided in the thrust collar for discharging the lubricant at a relatively higher pressure, and outlet means provided in the housing for the high pressure lubricant.

9. In a bearing structure, the combination of a housing, a rotatable shaft disposed in the housing, a thrust collar provided on the shaft, an oil receptacle associated with the shaft, a lower oil receptacle, band-applying means supported by the shaft for conducting oil from the lower receptacle to the receptacle associated with the shaft, communicating means provided between the last-mentioned receptacle and the thrust collar, pumping means provided in the thrust collar for discharging the oil at a relatively high pressure, and outlet means provided in the housing for the high pressure oil.

10. In a bearing structure, the combination of a housing, a horizontal rotatable shaft disposed within the housing, a thrust collar provided on the shaft, a plurality of segmental bearing shoes interposed between the thrust collar and the housing, a lubricant receptacle, means motivated by the shaft and adapted to conduct lubricant from the receptacle to the inner periphery of the thrust collar, pump means provided in the thrust collar for discharging the lubricant at a relatively higher pressure, and outlet means provided in the housing for the high pressure lubricant.

In testimony whereof, I have hereunto subscribed my name this 20th day of January, 1921.

HENRY F. SCHMIDT.